United States Patent
Yamaguchi et al.

(10) Patent No.: US 9,178,243 B2
(45) Date of Patent: Nov. 3, 2015

(54) POROUS SUPPORT FOR ELECTROCHEMICAL REACTION CELL HIGH-DENSITY INTEGRATION, AND ELECTROCHEMICAL REACTION CELL STACK AND ELECTROCHEMICAL REACTION SYSTEM COMPRISING THE POROUS SUPPORT FOR ELECTROCHEMICAL REACTION CELL HIGH-DENSITY INTEGRATION

(75) Inventors: Toshiaki Yamaguchi, Aichi (JP); Toshio Suzuki, Aichi (JP); Yoshinobu Fujishiro, Aichi (JP); Masanobu Awano, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1286 days.

(21) Appl. No.: 12/278,636

(22) PCT Filed: Feb. 23, 2007

(86) PCT No.: PCT/JP2007/053436
§ 371 (c)(1),
(2), (4) Date: Aug. 7, 2008

(87) PCT Pub. No.: WO2007/097434
PCT Pub. Date: Aug. 30, 2007

(65) Prior Publication Data
US 2009/0011328 A1   Jan. 8, 2009

(30) Foreign Application Priority Data
Feb. 23, 2006 (JP) .................. 2006-046095

(51) Int. Cl.
*H01M 8/10* (2006.01)
*H01M 8/24* (2006.01)
*H01M 4/86* (2006.01)
*H01M 8/02* (2006.01)
*H01M 4/88* (2006.01)
*H01M 4/90* (2006.01)
*H01M 4/92* (2006.01)
*H01M 8/00* (2006.01)
*H01M 8/12* (2006.01)

(52) U.S. Cl.
CPC .......... *H01M 8/2435* (2013.01); *H01M 4/8605* (2013.01); *H01M 4/8803* (2013.01); *H01M4/8885* (2013.01); *H01M 4/90* (2013.01); *H01M 4/9016* (2013.01); *H01M 4/92* (2013.01); *H01M 8/004* (2013.01); *H01M 8/0247* (2013.01); *H01M 8/0252* (2013.01); *H01M 8/1213* (2013.01); *H01M 8/1226* (2013.01); *C01P 2006/40* (2013.01); *H01M 4/86* (2013.01); *H01M 4/9033* (2013.01); *H01M 4/9066* (2013.01); *H01M 8/023* (2013.01); *H01M 8/1246* (2013.01); *H01M 8/243* (2013.01); *H01M 2008/1293* (2013.01); *Y02E 60/521* (2013.01); *Y02E 60/525* (2013.01)

(58) Field of Classification Search
CPC ............ H01M 4/8605; H01M 4/8807; H01M 4/8875; H01M 8/0247; H01M 8/025; H01M 8/0252
USPC .................................................. 429/400–535
See application file for complete search history.

(56) References Cited

U.S. PATENT DOCUMENTS

| | | | |
|---|---|---|---|
| 6,551,735 B2 * | 4/2003 | Badding et al. ............... | 429/486 |
| 2003/0027033 A1 * | 2/2003 | Seabaugh et al. ............... | 429/40 |
| 2004/0214070 A1 * | 10/2004 | Simner et al. ................... | 429/40 |
| 2005/0048356 A1 * | 3/2005 | Ihringer et al. ................. | 429/44 |

FOREIGN PATENT DOCUMENTS

| | | |
|---|---|---|
| JP | 63 106732 | 5/1988 |
| JP | 6 287060 | 10/1994 |
| JP | 2001 233683 | 8/2001 |
| JP | 2001 261463 | 9/2001 |
| JP | 2002-216779 A | 8/2002 |
| JP | 2002 329511 | 11/2002 |
| JP | 2003 137670 | 5/2003 |

| | | |
|---|---|---|
| JP | 2004 335277 | 11/2004 |
| JP | 2005 174846 | 6/2005 |
| JP | 2005 336539 | 12/2005 |
| JP | 2006 252836 | 9/2006 |
| WO | WO 03/069705 A2 | 8/2003 |

OTHER PUBLICATIONS

Sammes, N.M. et al., "Design and fabrication of a 100 W anode supported micro-tubular SOFC Stack", Journal of Power Sources, Elsevier, vol. 145, pp. 428-434, (2005).

\* cited by examiner

*Primary Examiner* — Jonathan G Leong
(74) *Attorney, Agent, or Firm* — Oblon, McClelland, Maier & Neustadt, L.L.P.

(57) ABSTRACT

The invention provides a porous support for integrating electrochemical reaction cells with high-density, having a plurality of through-holes, an electrochemical reaction cell stack and an electrochemical reaction system comprising the porous support for integrating electrochemical reaction cells with high-density, and the invention relates to a support for integrating electrochemical reaction cells with high-density, in which a plurality of through-holes provided in a porous support act as structural supports for electrochemical reaction cells, to an electrochemical reaction cell stack in which electrochemical reaction unit cells are integrated at a high density using the porous support, to an electrochemical reaction system comprising the electrochemical reaction cell stack, and to a manufacturing method thereof, and the present invention enables to provide a porous support for integrating electrochemical reaction cells with high-density, an electrochemical reaction cell stack and an electrochemical reaction system that can simultaneously realize a size reduction and higher-density integration of the electrochemical reaction cell stack as a unit cell integration product.

8 Claims, 6 Drawing Sheets

(A)
OPERATIVE TEMPERATURE: 450°C
FUEL GAS: NITROGEN-DILUTED 30% HYDROGEN GAS
GAS FLOW RATE: 10 cc/min (B) $H_2$ GAS FLOW INTO THROUGH-HOLES BEGINS (C) REDUCTION REACTION BEGINS AT FUEL ELECTRODE ON INNERMOST WALL OF THROUGH-HOLES ions. In the technical
POROUS SUPPORT FOR ELECTROCHEMICAL REACTION CELL HIGH-DENSITY INTEGRATION, AND ELECTROCHEMICAL REACTION CELL STACK AND ELECTROCHEMICAL REACTION SYSTEM COMPRISING THE POROUS SUPPORT FOR ELECTROCHEMICAL REACTION CELL HIGH-DENSITY INTEGRATION

TECHNICAL FIELD

The present invention relates to a porous support for integrating electrochemical reaction cells with high-density, and more particularly, to a porous support having a plurality of through-holes parallelly arrayed, to an electrochemical reaction cell stack comprising the porous support, and to an electrochemical reaction system comprising the cell stack. The present invention provides a porous support for integrating electrochemical cells with high-density, comprising a porous molded product, the shape of which is maintained by a three-dimensional reticulated structure formed by a gelling agent, and having a through-hole for forming an electrolyte layer and an electrode layer by coating thereof; and further provides an electrochemical reaction cell stack comprising the porous support, and an electrochemical reaction system comprising the cell stack as a constituent element.

BACKGROUND

Typical examples of electrochemical reaction systems are solid oxide fuel cells (hereinafter "SOFC") using a solid electrolyte having oxide ion conductivity. The basic structure of such SOFC is made of unit cells in which there are connected three layers of an air electrode/solid electrolyte /fuel electrode.

A fuel gas such as hydrogen, a hydrocarbon or the like is fed to the fuel electrode of the SOFC unit cell, while an oxidizing gas such as oxygen, air or the like is fed to the air electrode, whereupon there forms a difference between the oxygen partial pressure in the fuel electrode side and in the air electrode side. Oxygen, which is ionized at the air electrode, migrates towards the fuel electrode via the solid electrolyte. Upon reaching the fuel electrode, the oxide ions react with the fuel gas, releasing electrons in the process. When a load is connected to the fuel electrode and the air electrode, therefore, electrical energy can be extracted directly from the electrode chemical reaction.

The geometrical shape of such unit cells can be classified into flat-plate and tubular shapes. Among them, known tubular SOFC unit cells have a structure comprising an (inner) fuel electrode/solid electrolyte/(outer) air electrode, where the fuel gas flows inside the tube, and an (inner) air electrode/solid electrolyte/(outer) fuel electrode, where the oxidizing gas flows inside the tube.

Tubular SOFC unit cells widely used at present have tube diameters of about 20 mm and lengths of about 150 mm. SOFC power source devices, in which a plurality of such unit cells are integrated by way of interconnectors or collecting wires, are problematic on account of their extreme size and low output density per unit volume. There are also limits as regards size reduction in such devices, since integration operations are hard and complex on account of, for instance, handling difficulties (Non-patent document 1).

Other than SOFC, electrochemical reaction systems that have been proposed include, for instance, exhaust gas-cleaning electrochemical reactors and hydrogen production reactors. As is the case with the above SOFC, however, size reduction and higher-density integration of the electrochemical reaction unit cells are also difficult in such reactors, which underlies the need for developing novel integration structures that allow achieving higher efficiencies.

When the diameter of a tubular electrochemical reaction cell in a given unit volume is shrunk to 1/N, the surface area of the unit cell becomes 1/N, but the number of unit cells that can be integrated per unit volume increases by a factor of $N^2$. Therefore, it is estimated that there can be obtained an electrochemical reaction cell stack having an N-fold total surface area. As described above, however, conventional electrochemical reaction cell stacks have limits as regards size reduction and higher-density integration. In the technical field in question, thus, there is an urgent need for developing novel technologies and products that allow achieving both size reduction and higher-density integration in electrochemical reaction unit cells.

Non-patent document 1: N. M. Sammes, Y. Du, and R. Bove, J. Power Source, 145, 428-434 (2005)

DISCLOSURE OF THE INVENTION

In light of the above, the inventors carried out diligent research with the goal of developing a novel technology that allows achieving both size reduction and higher-density integration in electrochemical reaction unit cells. As a result, the inventors succeeded in developing a porous support for integrating electrochemical reaction cells with high-density, thereby perfecting the present invention. An object of the present invention is to provide a porous support in which electrochemical reaction cells can be easily integrated, an electrochemical reaction cell stack comprising the porous support, and an electrochemical reaction system comprising the cell stack as a constituent element.

Another object of the present invention is to provide an electrochemical reaction cell stack, and an electrochemical reaction system comprising the cell stack, such that the electrochemical reaction cell stack has integrated therein electrochemical reaction cells by using, as a basic skeleton, a porous support comprising a molded product that combines porosity and a plurality of through holes, the shape of the porous support being maintained by a three-dimensional network structure formed by a gelling agent, and by coating the inner walls of the through-holes with multiple layers of electrolyte and electrode materials.

In order to solve the above problems, the present invention encompasses the below-described technical means.

(1) A porous support for electrochemical reaction cells, comprising 1) a porous molded product, the shape of which is maintained by a three-dimensional reticulated structure formed by a gelling agent, and having 2) a through-hole for coating an electrolyte layer and an electrode layer.

(2) The porous support according to (1) above, wherein said porous support comprise a plurality of through-holes arrayed parallelly.

(3) The porous support according to (1) above, wherein said gelling agent is an organic compound containing at least one selected from agar, agarose, carrageenan, xanthane gum and gelatin.

(4) The porous support according to (1) above, wherein the material of said porous support is an oxide for air electrodes containing at least one element from among La, Mg, Ca, Sr, Mn, Co and Fe, or a composite or cermet containing at least one among Ni, Cu and Ag, and a solid electrolyte material for fuel electrodes.

(5) The porous support according to (1) above, wherein the material of said porous support is an insulating oxide, or a collector oxide containing two or more elements from among La, Cr, Ca, Sr, Ni and Mg.

(6) An electrochemical reaction cell or an electrochemical reaction cell stack comprising an integrated product of the electrochemical reaction cell, comprising the porous support defined in (1) above, wherein an electrode material, and two layers of an electrolyte material and another electrode material are formed on the inner wall of a through-hole in the porous support.

(7) An electrochemical reaction cell or an electrochemical reaction cell stack comprising an integrated product of the electrochemical reaction cell, comprising the porous support defined in (1) above, wherein an oxide other than an electrode material, and three layers of an electrode, an electrolyte material and another electrode material are formed on the inner wall of a through-hole in the porous support.

(8) The electrochemical reaction cell or electrochemical reaction cell stack according to (6) or (7) above, wherein said electrolyte material is a compound oxide containing two or more elements selected from among Zr, Ce, Mg, Sc, Ti, Al, Y, Ca, Gd, Sm, Ba, La, Sr, Ga, Bi, Nb and W.

(9) The electrochemical reaction cell or electrochemical reaction cell stack according to (6) or (7), wherein said electrode material is an oxide for air electrodes, or a composite or cermet for fuel electrodes.

(10) The electrochemical reaction cell or electrochemical reaction cell stack according to (9) above, wherein said electrode material comprises an active auxiliary material, and the active auxiliary material is a metal containing at least one element from among Pt, Pd, Ag, Ba, Sr, Ca, Mg, K, Na, Mn, Fe, Co, Ni, Cu, Zn, Ti, Al, Ga, Nb, Ta, V and La, or an oxide containing one or more of the foregoing elements.

(11) An electrochemical reaction system, comprising the electrochemical cell stack defined in (6) or (7) above, as a constituent element.

(12) A method for manufacturing a porous support for electrochemical reaction cells, comprising:

casting into a molding tool a ceramic slurry containing an electrode material, or an oxide powder other than an electrode material, and a gelling agent; gelling the slurry; and obtaining thereafter a molded product by drying the slurry.

(13) The method for manufacturing the porous support according to (12) above, wherein a molded product having a plurality of through-holes formed therein parallelly is manufactured by way of a mold having a plurality of parallelly arrayed cores.

The present invention is explained in detail next.

The present invention is a porous support for electrochemical reaction cells, comprising a porous molded product, the molding shape whereof is maintained by a three-dimensional network structure formed by a gelling agent, and a through-hole for coating an electrolyte layer and an electrode layer. In the present invention, the gelling agent is an organic compound containing at least one selected from agar, agarose, carrageenan, xanthane gum and gelatin. Also, the porous support comprises plurality of through-holes arrayed parallelly.

In the present invention, the porous support is an oxide for air electrodes comprising one or more elements from among La, Mg, Ca, Sr, Mn, Co and Fe, or a composite or cermet comprising at least one among Ni, Cu and Ag, and a solid electrolyte material for fuel electrodes. Alternatively, the material of the porous support is an insulating oxide, or a collector oxide comprising two or more elements from among La, Cr, Ca, Sr, Ni and Mg.

The present invention is also an electrochemical reaction cell having the porous support as a skeleton, wherein the porous support comprises an electrode material, and two layers of an electrolyte material and another electrode material formed on the inner wall of the through-holes in the porous support, or wherein the porous support comprises an oxide other than an electrode material, and three layers of an electrode, an electrolyte material and another electrode material formed on the inner wall of the through-holes in the porous support.

In a preferred embodiment of the present invention, the electrolyte material is a compound oxide comprising two or more elements selected from among Zr, Ce, Mg, Sc, Ti, Al, Y, Ca, Gd, Sm, Ba, La, Sr, Ga, Bi, Nb and W, the electrode material is an oxide for air electrodes, or a composite or cermet for fuel electrodes, the electrode material comprises an active auxiliary material, and the active auxiliary material is a metal comprising at least one element from among Pt, Pd, Ag, Ba, Sr, Ca, Mg, K, Na, Mn, Fe, Co, Ni, Cu, Zn, Ti, Al, Ga, Nb, Ta, V and La, or an oxide comprising one or more of the foregoing elements.

As characterizing features, the present invention is also an electrochemical reaction cell stack in which there are integrated electrochemical reaction cells formed in a plurality of through-holes in the porous support, an electrochemical reaction system comprising that stack as a constituent element, as well as a method for manufacturing the porous support, comprising the steps of casting into a molding mold a ceramic slurry containing an electrode material, or an oxide powder other than an electrode material, and a gelling agent, gelling the slurry, and obtaining thereafter a molded product by drying the slurry. In a preferred embodiment of the present invention, a molded product having a plurality of parallelly arrayed through-holes formed therein is manufactured by way of a mold having a plurality of parallelly arrayed cores.

Tubular electrochemical reaction unit cells widely used at present have tube diameters of about 20 mm and lengths of about 150 mm. Electrochemical reaction systems in which a plurality of such unit cells are integrated by way of interconnectors or collecting wires are problematic in that, besides their extreme size, they do not allow achieving higher efficiencies per unit volume. There are also limits as regards size reduction in such electrochemical reaction systems, since the integration operations are difficult and complex. However, the present invention uses a porous support in which a plurality of electrochemical reaction cells can be easily integrated, as described above, which allows as a result building an electrochemical reaction system that can simultaneously realize size reduction and higher-density integration of an electrochemical reaction cell stack as an integration product of integrated unit cells.

In the present invention, suitable examples of the above electrochemical reaction system include, for instance, solid oxide fuel cells (SOFC), exhaust-gas cleaning electrochemical reactors, and hydrogen production reactors. Arbitrary cell structures can be formed in the above electrochemical reaction cells by appropriately selecting the materials of the air electrode, the electrolyte and the fuel electrode. High-efficiency electrochemical reaction systems can thus be built for the above-described applications.

An explanation follows next on a porous support having a plurality of through-holes according to an embodiment of the present invention, and an electrochemical reaction cell stack and electrochemical reaction system comprising the porous support. The electrochemical reaction cell stack according to the present invention will be explained first. The electrochemical reaction system is built by arraying a plurality of electrochemical reaction cell stacks having integrated therein electrochemical reaction cells formed on the inner walls of through-holes within a porous support.

The electrochemical reaction cell stack, which is the basic unit of the electrochemical reaction system, uses in the present invention an integrated structure of electrochemical reaction cells that employ, as cell supports, the inner walls of a plurality of through-holes arrayed parallelly in a porous support. By restricting the unit cell size down to the diameter of the through-holes that run through the porous support, and by building a plurality of through-holes into the porous support, the present invention allows achieving a porous support in which there can be integrated a plurality of unit cells. Although the shape of the electrochemical reaction unit cells is determined herein by the shape of the through-holes, a tubular shape, an angular shape or the like can appropriately be selected as the shape of the unit cells, in accordance with the intended application.

In the present invention there can be used broadly two kinds of structure of the electrochemical cells that employ through-holes in a porous support. In a first structure type, a plurality of electrochemical reaction cells can be integrated by using the porous support itself as part of the electrochemical reaction cell structure. In a second structure type, a plurality of electrochemical reaction cells can be integrated by building the entire electrochemical reaction cell structure on the inner walls of the through-holes. The two types are explained in detail next.

FIG. 1 illustrates a schematic diagram of an electrochemical reaction cell stack. As illustrated in FIG. 1, a plurality of through-holes 2 is formed in a porous support 1 manufactured by cast molding, while a compact electrolyte layer 3 is formed on the inner wall of each through-hole 2 in the porous support 1, which comprises an electrode material. Forming then an electrode layer 4 on the inner wall of the electrolyte layer 3 yields an electrochemical reaction cell 5 that comprises a layered structure of the porous support (electrode layer) 1/electrolyte layer 3/electrode layer 4. The same process is carried out on the inner walls of the plurality of through-holes 2 in the porous support 1, to build thereby the electrochemical reaction cell stack 6 that is an integrated product of the electrochemical reaction cells 5.

Examples of preferred typical electrode materials that can be used as the porous support (electrode phase) 1 illustrated in FIG. 1 include, for instance, oxides for air electrodes, comprising one or more elements from among La, Mg, Ca, Sr, Mn, Co and Fe, or a composite or cermet comprising at least one among Ni, Cu and Ag, and a solid electrolyte material for fuel electrodes.

Further, as illustrated in FIG. 2, a plurality of through-holes 8 are formed in a porous support 7 comprising an insulating oxide, or a collector oxide comprising two or more elements from among La, Cr, Ca, Sr, Ni and Mg. An electrochemical reaction cell 12 is built then by forming an electrode layer 9, a compact electrolyte layer 10, and an electrode layer 11 on the inner wall of each through-hole 8 in the porous support 7.

The same process is carried out on the inner walls of the plurality of through-holes in the porous support 7, to build thereby the electrochemical reaction cell stack 13 that is an integrated product of the electrochemical reaction cells 12. Preferred representative examples of oxides used as the insulating oxide material in the porous support 7 illustrated in FIG. 2 include, but not limited to, alumina, zirconia or the like.

The porosity required in the porous support is explained next. To be functional, the electrochemical reaction cells having the porous support as a basic skeleton require oxygen or a fuel gas to diffuse into the porous support, to be continuously fed into the interface between the electrode layers and the compact electrolyte layers, and hence the porous support must possess gas permeability. Moreover, when the porous support 1 is formed of an air electrode material, as illustrated in FIG. 1, the porosity of the porous support is preferably not lower than about 15%, so as to allow a gas to permeate not only into pores but also through the material. When the porous support 1 comprises a fuel electrode material, a reduction reaction takes place simultaneously with gas diffusion, and hence the porosity of the porous support 1 must be not lower than about 10%.

By contrast, in the case of the porous support 7 illustrated in FIG. 2, which uses a material other than an electrode material, the gas diffusion path is limited to pores alone, and hence the porosity must be not lower than about 30%. In all cases, the porous support forms the basic skeleton of the electrochemical reaction cell stack, and thus the maximum porosity of the porous support is preferably no greater than about 60%, with a view to preserving the strength of porous support.

A method for manufacturing the porous support of the present invention, and the electrochemical reaction cell stack and electrochemical reaction system comprising the porous support, is explained next. Specifically, the method for manufacturing the cell stack and so forth of the present invention comprises the steps of manufacturing a porous support comprising through-holes, applying a multilayer coating on the inner walls of the through-holes, so as to form electrochemical reaction cells, and firing.

The method for manufacturing the porous support, which is the most characteristic feature of the present invention, will be explained first. A ceramic slurry for molding the porous support is prepared by dissolving in water an organic polymer, typified by agar, agarose, carrageenan, xanthane gum, gelatin or the like, as a gelling agent, and by dispersing then, in the obtained aqueous solution, a ceramic powder for molding the porous support. Despite restrictions during molding, such as the need for atmosphere control and the like, an organic monomer resin such as a water-soluble epoxy resin can also be used as the gelling agent.

Although such organic polymers gel readily in the atmosphere, to form a three-dimensional network, they have been beset heretofore with problems such as low solids and cracking during degreasing and firing (Japanese Patent Application Laid-open No. 2003-201188). In the present invention, however, it has been shown that a porous molded product having sufficient strength can be obtained by mixing an organic polymer, water and a ceramic powder for molding the support, with appropriate mixing ratios.

Specifically, the addition amount of gelling agent is limited by its solubility in water. In case of, for instance, agar, the latter is therefore used, preferably, in an amount of 1 g to 10 g, ideally 3 g to 7 g, in 100 g of water. In terms of achieving homogeneous dispersibility in aqueous solution, the addition amount of ceramic powder is preferably 50 g to 200 g, ideally 100 g to 160 g, in 100 g of water. For organic polymers other than the above, preferred mixing ratios of water and organic polymer and ceramic powder are determined taking into account the solubility of the organic polymer in water and the need for preserving the dispersibility of the powder. In the present invention, a pore-forming agent such as a carbon powder or the like can be added to the ceramic slurry, as the case may require.

The obtained ceramic slurry for molding the porous support is then cast into a molding mold, and is gelled, dried and demolded to yield a porous molded product. A porous molded product having a plurality of parallelly arrayed through-holes is formed when the molding mold has a plurality of parallelly arrayed cores. The cores can have any shape, for instance a solid cylindrical shape, a prismatic shape or the like. The obtained porous molded product can be pre-sintered, as the case may require, up to a temperature of 1100° C. As a result there can be obtained a porous molded product or a porous molded product having a plurality of through-holes.

Next, an electrode material and an electrolyte material are coated onto the inner walls of the through-holes in the porous molded product, in such a way so as to form an electrochemical reaction cell structure, followed by drying and firing. As a result there can be obtained an electrochemical reaction cell stack having integrated therein electrochemical reaction cells and unit cells, such as those illustrated in FIGS. 1 and 2. The above operations may involve although not limited thereto, repeated coating and firing, for each layer, or coating of a plurality of layers, followed by simultaneous firing or the like. The operations, however, are not limited thereto, and may involve appropriate methods and procedures.

The electrolyte material that is used must be a material having high ion conductivity. Examples of preferred materials that can be used include, for instance, a compound oxide comprising two or more elements selected from among Zr, Ce, Mg, Sc, Ti, Al, Y, Ca, Gd, Sm, Ba, La, Sr, Ga, Bi, Nb and W.

Examples of the material used in the electrode layer 4 and the electrode layer 11 illustrated in FIGS. 1 and 2 include, for instance, the above oxide for air electrodes, the above composite or cermet for fuel electrodes, as well as an active auxiliary material. Active auxiliary materials denote herein materials that assist in electrode performance activity in such a manner that the electrochemical reaction system operates with high efficiency.

Examples of preferred such materials include metals comprising at least one element from among Pt, Pd, Ag, Ba, Sr, Ca, Mg, K, Na, Mn, Fe, Co, Ni, Cu, Zn, Ti, Al, Ga, Nb, Ta, V and La, or an oxide comprising one or more of the foregoing elements.

In the present invention, fine cylindrical holes having a sub-millimeter diameter no greater than 1.0 mm are formed simultaneously in the porous support by cast molding. Further, the electrolyte layers and the electrode layers are formed on the surface of the hole walls in the porous support by way of sol coating. That is, an electrolyte material slurry and an electrode material slurry are coated onto the surface of the hole wall, followed by firing, to form respectively a compact electrolyte film having a thickness no greater than 50 μm, and an electrode film having adequate voids. The compactness and/or deposited film thickness can be controlled, for instance, on the basis of the sol coating conditions and the firing temperature, taking into account the sintering shrinkage of the porous support. The compactness and deposited film thickness of the coated film exert a great influence on gas separation, insulation between electrodes, and residual stresses generated between the electrolyte/support, and hence are set to lie within appropriate ranges that take the foregoing into account.

The coating method for layering a multilayer comprising an electrolyte layer and an electrode layer onto the surface of the inner walls of the through-holes in the porous support may be, for instance, sol coating. The coating method, however, is not limited thereto, and any appropriate coating method may be used. Also, the porosity of the porous support, the diameter of the through-holes formed in the porous support, and the thickness and compactness of the respective deposited films in the layered structure can be designed arbitrarily. Appropriate numerical values of the foregoing include, for instance, a porosity of 15 to 40% for the support, a diameter of 0.4 to 0.8 mm for the through-holes, and a compact electrolyte having a thickness of 10 to 15 μm.

The present invention affords the following effects.

(1) The porous support of the present invention is advantageous in that a porous structure and a plurality of through-holes are achieved simultaneously thanks to the three-dimensional network structure formed by a gelling agent. As a result, this allows easily integrating electrochemical reaction cells having a layered structure of electrolyte and electrode materials.

(2) The present invention allows providing a porous support in which a plurality of electrochemical reaction cells can be easily integrated.

(3) The present invention allows providing an electrochemical reaction system that can simultaneously realize size reduction and higher-density integration of an electrochemical reaction cell stack as an integration product of integrated unit cells.

(4) In the present invention, electrochemical reaction cells, having a sub-millimeter tubular structure with diameters no greater than 1.0 mm, are formed on the inner walls of the through-holes of the porous support. As a result, the present invention allows easily achieving high porosities, beyond the limits imposed by the problem of cell strength observed in conventional tubular cells.

(5) The basic skeleton of the high-porosity electrochemical reaction cell stack can be formed even when the porous support comprises an air electrode material, or a fuel electrode material. A small high-performance electrochemical reaction cell stack can be easily built as a result.

(6) An electrochemical reaction system, such as a power source device or the like, can be built by combining a plurality of electrochemical reaction cell stacks in which electrochemical reaction cells are integrated.

BEST MODE FOR CARRYING OUT THE INVENTION

The present invention is explained in concrete terms below on the basis of examples. The present invention, however, is in no way meant to be limited to or by the examples.

Example 1

A slurry was prepared by mixing, under heating, 30 parts by weight of zirconia powder, 1 part by weight of agar, and 30 parts by weight of distilled water. The slurry was cast in a 15 mm×15 mm×15 mm mold, having arrayed therein 10×10 (total 100) long solid cylinders having a diameter of 0.8 mm and a length of 1 mm, and was molded through gelling at room temperature. The mold was removed, and a porous molded product comprising 100 through-holes was obtained through drying in a refrigerator. The content of gelling agent in the molded product was 3 wt %.

Figure 1:
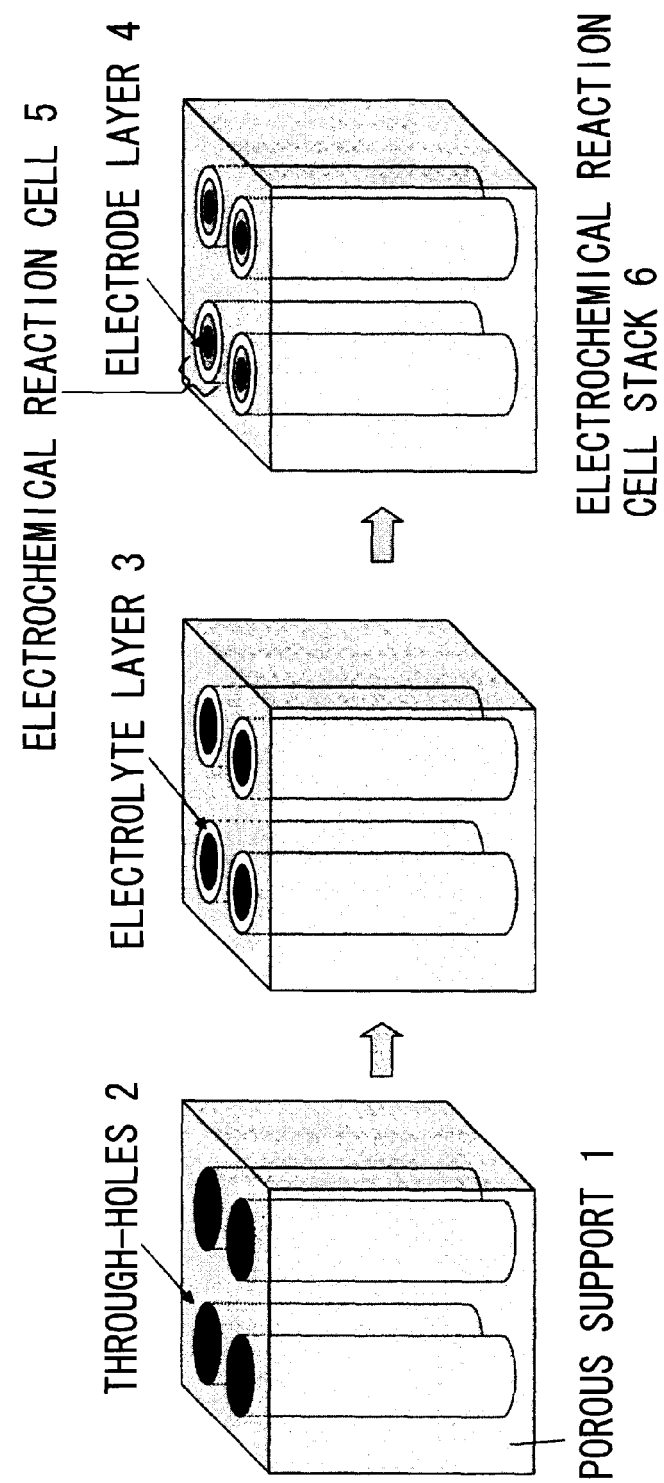
FIG. 1 is a schematic diagram of electrochemical reaction cells formed in a porous support comprising an electrode material, and of an electrochemical reaction cell stack as an integrated product of electrochemical reaction cells.
Figure 2:
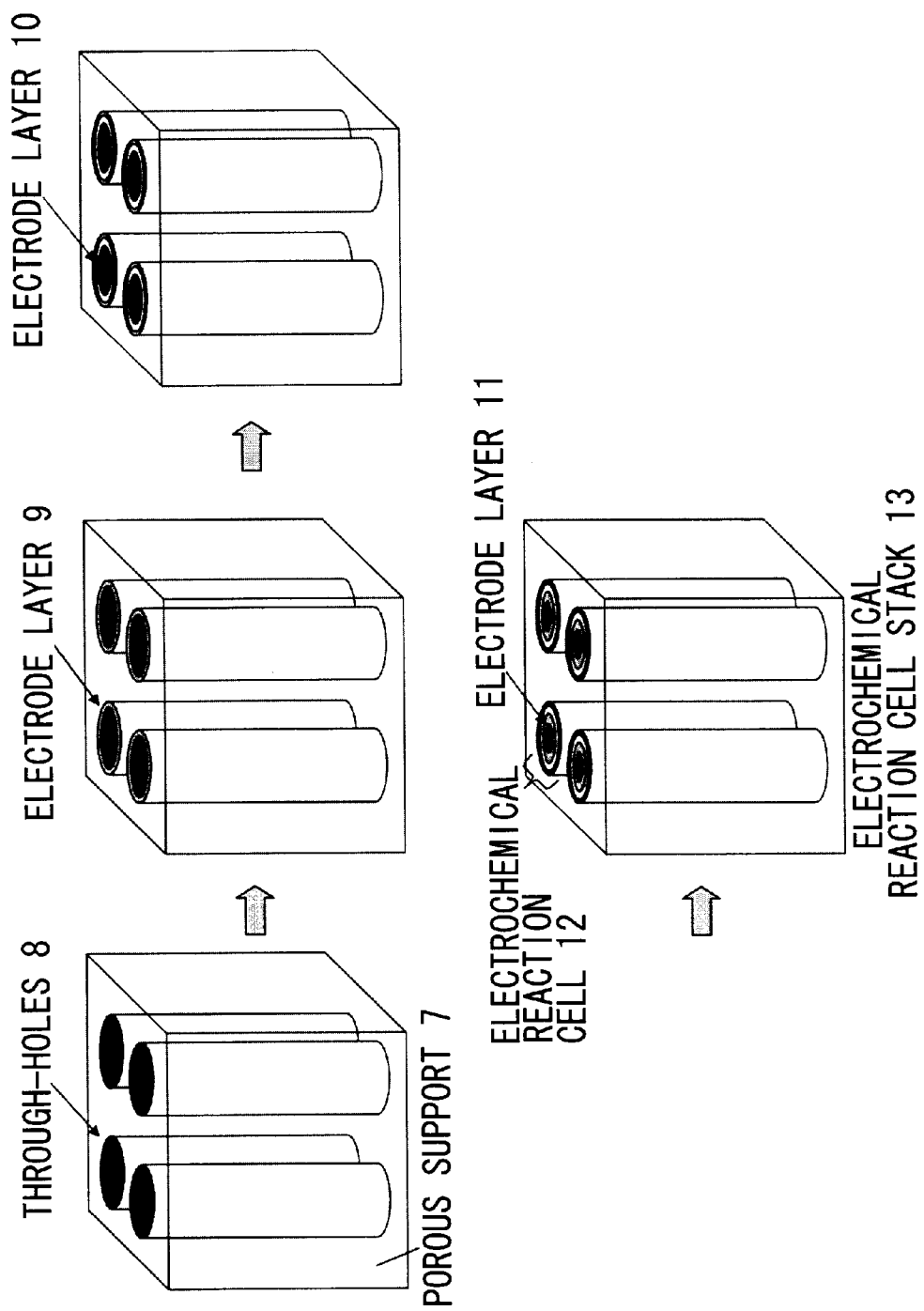
FIG. 2 is a schematic diagram of electrochemical reaction cells, formed in a porous support comprising an oxide other than an electrode material, and of an electrochemical reaction cell stack as an integrated product of electrochemical reaction cells.
Figure 3:
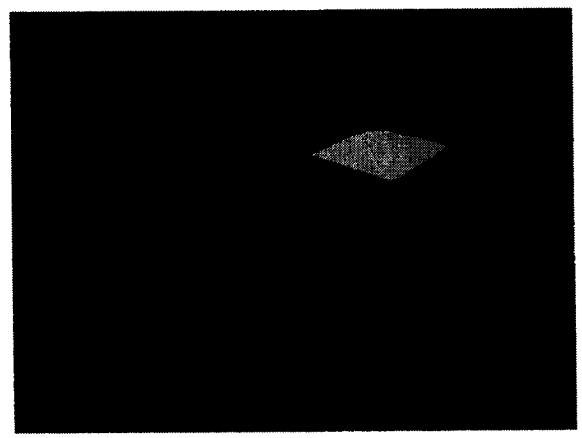
FIG. 3 illustrates the appearance of a porous support, having a plurality of through-holes, manufactured in Example 1.
Figure 4:
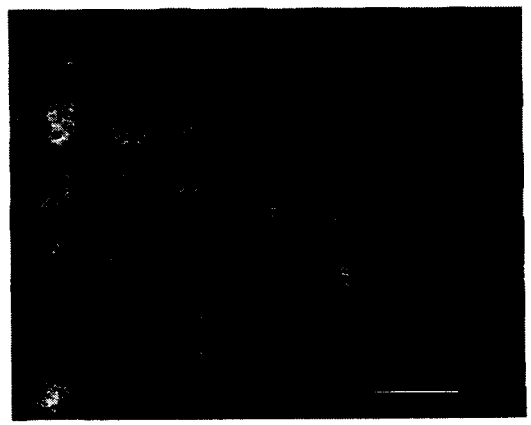
FIG. 4 illustrates a cross-sectional SEM micrograph of the porous support, having a plurality of through-holes, manufactured in Example 1.

The molded product was fired at 1300° C. in air, to yield a porous support having a porosity of 40%. FIG. 3 illustrates the appearance of the obtained porous support. As FIG. 3 shows, the support had an outer diameter of 7.5 mm×7.5 mm×7.5 mm, and a hole diameter of 0.4 mm. As regards the through-holes, FIG. 4 illustrates a cross-sectional SEM image of the porous support.

Example 2

A slurry was prepared by mixing, under heating, 30 parts by weight of lanthanum manganate powder, 1 part by weight of agar, and 20 parts by weight of distilled water. The slurry was cast in a 15 mm×15 mm×15 mm mold, having regularly arrayed therein 5×5 (total 25) solid cylinders of a diameter of 0.9 mm and a length of 1 mm, and was molded through gelling at room temperature. The mold was removed, and a porous molded product comprising 25 through-holes was obtained through drying in a refrigerator. The content of gelling agent in the molded product was 3 wt %. The molded product was fired at 1300° C. in air, to yield a porous support having a porosity of 47%. The support had an outer diameter of 10 mm×10 mm×10 mm, and a hole diameter of 0.6 mm.

Comparative Example 1

A molded product having through-holes was obtained by adding 9 parts by weight of water to 20 parts by weight of lanthanum manganate powder and 3 parts by weight of a cellulosic polymer, followed by kneading and extrusion molding. The content of cellulosic polymer in the molded product, after drying in a cool box, was 13 wt %. The molded product was fired at 1300° C. in air to yield a lanthanum manganate ceramic having a porosity of 16%.

The above results show that the present invention allows obtaining a high-porosity porous material of complex shape using only a very small amount of organic polymer, as compared with the case where a molded product is manufactured by extrusion molding.

Example 3

Figure 5:
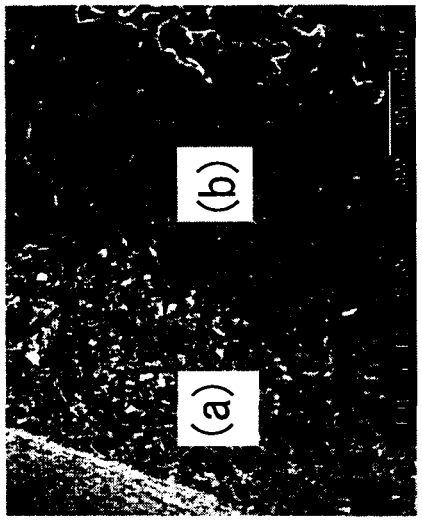
FIG. 5 illustrates a cross-sectional SEM micrograph, and an enlarged image thereof, of the cell structure formed on the inner walls of the through-holes in the porous support of Example 3.
Figure 5:
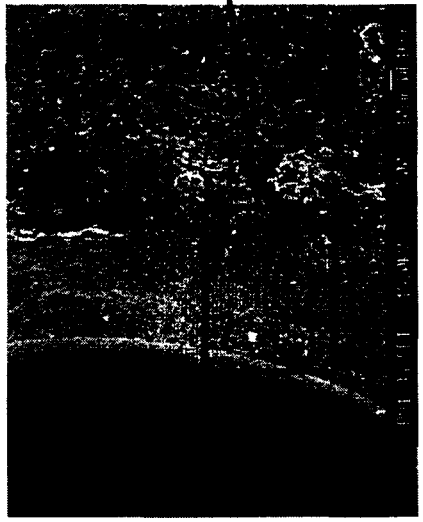
Figure 6:
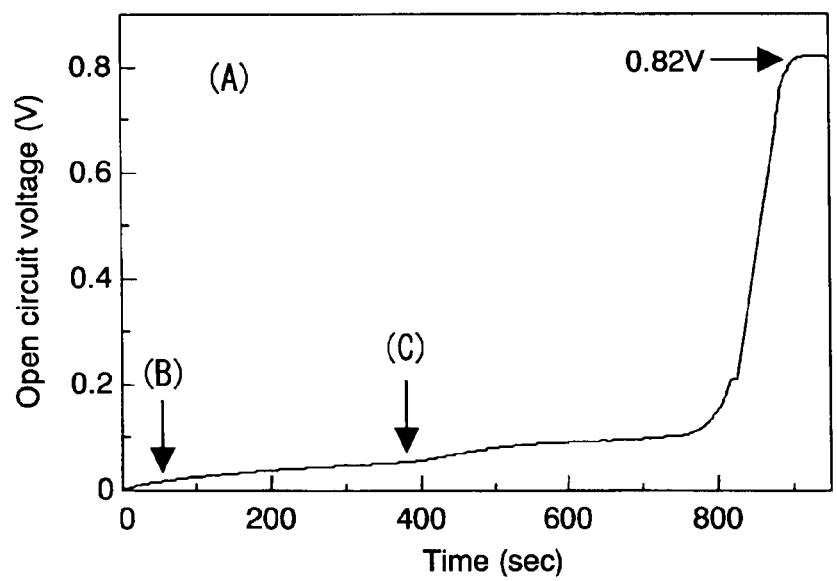
FIG. 6 illustrates the results of a measurement of open circuit voltage in cells formed on the inner walls of the through-holes in the porous support of Example 3.

The inner walls of the through-holes formed in the lanthanum manganate porous support described in Example 2 were coated with a ceria-based electrolyte layer, which in turn was coated with a ceria-nickel oxide layer for fuel electrodes, followed by firing at 1300° C. in air to yield an electrochemical reaction cell stack. FIG. 5 illustrates a cross-sectional SEM micrograph, and an enlarged image thereof, of the cell structure formed on the inner walls of the through-holes. In the obtained electrochemical reaction cell stack, reduction started in the fuel electrodes, at the innermost wall of the through-holes about 5 minutes after infusion of hydrogen gas into the through-holes, with an open circuit voltage of 0.8 V or more being achieved about 15 minutes after infusion of hydrogen gas into the through-holes, as illustrated in FIG. 6, under conditions involving an operative temperature of 450° C., nitrogen-diluted 30% hydrogen gas as the fuel gas, and a fuel gas flow rate of 10 cc/min.

INDUSTRIAL APPLICABILITY

As described above, the present invention relates to a porous support for integrating electrochemical reaction cells with high-density, an electrochemical reaction cell stack and an electrochemical reaction system comprising the porous support for integrating electrochemical reaction cells with high-density. The invention allows providing and manufacturing a porous support for integrating electrochemical reaction cells with high-density, in which through-holes are formed in a porous molded product, an electrochemical reaction cell in which an electrolyte layer and an electrode layer are coated onto the inner walls of the through-holes formed in the porous support, an electrochemical reaction cell stack in which these cells are integrated, and an electrochemical reaction system comprising such cell stacks. The present invention boasts high technical significance as it provides a novel electrochemical reaction cell or electrochemical reaction cell stack that allows realizing both size reduction and higher-density integration in the electrochemical reaction cell or electrochemical reaction cell stack.

The invention claimed is:

1. An electrochemical reaction cell stack comprising:
a porous support;
through-holes parallelly arrayed in the porous support; and
electrolyte and electrode materials formed on an interior surface of the through-holes,
wherein the porous support is homogeneous as a three dimensional reticulated structure around the through-holes formed by a gelling agent,
the porous support possesses gas permeability with a porosity of 15 to 47% and functions as air paths for permeating an air therethrough,
the through-holes are through-holes A extending through the porous support and the porous support has no other through-holes parallelly arrayed therein,
each of the through-holes A has a diameter of 0.4 to 0.8 mm,
the porous support comprises an air electrode material,
a layer of electrolyte material is coated onto an interior surface of each of the through-holes A,
a layer of fuel electrode material is formed on a surface of the layer of the electrolyte material in each of the through-holes A, and
each of the through-holes A functions as fuel channel for infusing a fuel gas thereinto.

2. The electrochemical reaction cell stack according to claim 1, wherein said electrolyte material is a compound oxide comprising two or more elements selected from the group consisting of Zr, Ce, Mg, Sc, Ti, Al, Y, Ca, Gd, Sm, Ba, La, Sr, Ga, Bi, Nb and W.

3. The electrochemical reaction cell stack according to claim 1, wherein said air electrode material comprises an oxide.

4. The electrochemical reaction cell stack according to claim 3, wherein said air electrode material comprises an active auxiliary material, and the active auxiliary material is a metal comprising at least one element selected from the group consisting of Pt, Pd, Ag, Ba, Sr, Ca, Mg, K, Na, Mn, Fe, Co, Ni, Cu, Zn, Ti, Al, Ga, Nb, Ta, V and La, or an oxide comprising one or more of the foregoing elements.

5. An electrochemical reaction system, comprising the electrochemical cell stack defined in claim 1, as a constituent element.

6. The electrical reaction cell stack according to claim 1, wherein said gelling agent is an organic compound comprising at least one selected from the group consisting of agar, agarose, carrageenan, xanthane gum and gelatin.

7. The electrical reaction cell stack according to claim 1, wherein the air electrode material comprises an oxide of at least one element selected from the group consisting of La, Mg, Ca, Sr, Mn, Co and Fe.

8. The electrical reaction cell stack according to claim 1, wherein the porous support has a porosity of 15 to 40%.

\* \* \* \* \*